(12) United States Patent
Shcherbakov et al.

(10) Patent No.: US 7,820,292 B2
(45) Date of Patent: *Oct. 26, 2010

(54) NANOSTRUCTURED COATING FOR A CARRYING BASE

(75) Inventors: Igor Shcherbakov, Moscow (RU); Vladimir Sleptsov, Moscow (RU); Sergey Dmitriev, Moscow oblast (RU); Mikhail Itkis, Moscow oblast (RU)

(73) Assignee: C-K Group Ltd, Nicosia (CY)

( * ) Notice: Subject to any disclaimer, the term of this patent is extended or adjusted under 35 U.S.C. 154(b) by 0 days.

This patent is subject to a terminal disclaimer.

(21) Appl. No.: 11/920,299

(22) PCT Filed: May 16, 2006

(86) PCT No.: PCT/RU2006/000238
§ 371 (c)(1),
(2), (4) Date: Jan. 12, 2009

(87) PCT Pub. No.: WO2006/130046
PCT Pub. Date: Dec. 7, 2006

(65) Prior Publication Data
US 2009/0202784 A1 Aug. 13, 2009

(30) Foreign Application Priority Data
May 31, 2005 (RU) ............................ 2005116488

(51) Int. Cl.
*B32B 9/00* (2006.01)

(52) U.S. Cl. .............. 428/408; 428/312.2; 428/312.8; 428/458; 428/480; 428/699

(58) Field of Classification Search .............. 428/408, 428/688, 689, 699, 469, 336, 411.1, 304.4, 428/312.2, 312.8, 318.4, 319.3
See application file for complete search history.

(56) References Cited

U.S. PATENT DOCUMENTS

| | | | | |
|---|---|---|---|---|
| 3,900,775 A | * | 8/1975 | Takashima et al. | 361/323 |
| 5,431,971 A | * | 7/1995 | Allegret et al. | 428/148 |
| 6,551,653 B1 | * | 4/2003 | Hatke et al. | 427/171 |
| 2004/0247949 A1 | * | 12/2004 | Akedo et al. | 428/704 |

FOREIGN PATENT DOCUMENTS

RU 2217394 C1 * 3/2002

OTHER PUBLICATIONS

Kravets et al., Production of asymmetric track membranes by gas-discharge method, Surface and Coatings Technology, 2003, p. 821-825.*
Translation of RU 2217394 to Baranov et al.*
Shen et al., Amorphous carbon nitride thin films deposited by electrolysis of methanol and urea organic solutions, Journal of materials science letters, 18, N month 1999, pp. 317-319.*

* cited by examiner

*Primary Examiner*—Timothy M Speer
(74) *Attorney, Agent, or Firm*—Patent Jurist; Georgiy L. Khayet

(57) ABSTRACT

The invention pertains to high-molecular compound-based composite materials using carbon in nanostructured coatings including additional elements and bonds.

Nanostructured coating of the carrying base comprises layers of amorphous carbon of sp-, sp2- and sp3-hybridized states of carbon atoms.

New is that coating with a highly-developed surface of the polyester film base is directly bonded by the layer of sp3-hybridized state of carbon atoms and has on top an extra metal layer 25-250 nm thick; at the same time the film base surface has corrugations 10-30 nm deep and/or is furnished with pores 0.2-6 micron in size of a total volume of 10-60%, with ⅕-⅓ portion of pores made through.

The proposed technical solution is a new film material with functional nanostructured coating intended to be used as an anode of the electrolytic capacitor due to an accumulated electric potential in current-carrying layers separated by the polyester base having a highly developed modified surface that provided their adhesion and improved the electrophysical characteristics of the material.

13 Claims, 1 Drawing Sheet

NANOSTRUCTURED COATING
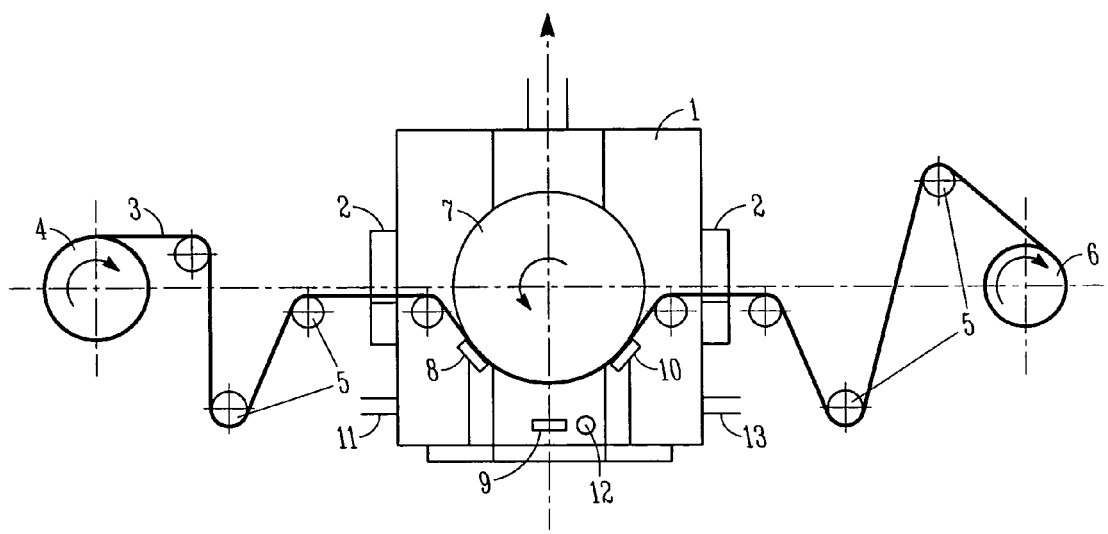

NANOSTRUCTURED COATING FOR A CARRYING BASE

RELATED APPLICATIONS

This application is a nationalization under 35 U.S.C. 371 of PCT/RU2006/000238, filed May 16, 2006 and published as WO 2006/130046 A3 on Dec. 7, 2006, which claimed priority under 35 U.S.C. 119 to Russian Patent Application Serial No. 2005116488, filed May 31, 2005; which applications and publication are incorporated herein by reference and made a part hereof.

This invention pertains to composite materials on the base of high-molecular compounds using carbon in nanostructured coatings comprising extra elements and couplings.

The state-of-the-art of this technology characterizes porous electroconductive sandwiched material according to U.S. Pat. No. 5,696,198, C 08 K3/04, 1997, that consists of a permeable polymer matrix (base) with highly porous fine-dispersed carbon fiber fillers.

This film modified composite material 70-300 pm thick of a density of 0.6-0.9 g/m3 and bulk microporosity of 0.1-0.6 cm3/g possesses hydrophobic property, bioinertness, thermal and chemical resistance, bactericidal action that enables using it to treat liquid and gaseous media. A high electric conductivity of the material intensifies sorption and filtration, sorption and diffusion, greatly increases the sorption selectivity, enables regulating the rate both of sorption and desorption that is necessary in material re-using.

The material as an electric sorbent can be used in water desalination in electric dialysis devices. A low electric resistance of the material and adapted porous structure provided reducing power consumption in electric dialysis as compared with ion-exchange diaphragms by 30%.

However, advantages of the described film composite material are accompanied with inherent disadvantages: low mechanical, strength of the polymer base and relatively great thickness that limit its use as electrolytic capacitor plates due to the impossibility to produce it applying the advanced roll technology of the polymer base metallization upon its pulling through the sputtering chamber, as well as large dimensions of capacitors in which anodes made of this film are mounted.

The aforesaid disadvantages were eliminated in film 11-14 μm thick made of polyester material (polyethylene terephthalate) with two-sided nanodimensional current-carrying coating of wide range of metals that are vapor-phase deposited in vacuum or sputtered onto moving film. Metallized coating can be composite and additionally comprise oxides, borides, nitrides, sulfides, carbides, etc., that extends functional possibilities of products made thereof.

The material is of a density of 1.35-1.45 g/cm3, breaking strength of 200 to 300 N/mm² and melting point of 200 to 250° C.

A disadvantage of the described metallized film is a low functional reliability upon using as an electrolytic capacitor anode due to metal layer peeling of the polyester film that is predetermined by their low adhesion.

In order to improve the adhesion with the polymer base bonds through various sublayers are used as described in patent RU 2217394, C 03C 17/34, 2003, where multi-layer nanostructured coating is made of amorphous carbon layers of sp-, sp2 and sp3-hybridized states. This coating is characterized by an increased adhesion to elastic film substrate, compatibility with metal and low surface roughness.

The latter matter is a limiting factor for the use of the described composite material as an electrolytic capacitor anode because of a low specific electric capacity that depends on the area of the film electrode surface.

The goal at the solution of which this invention is aimed consists of improving the electrophysical properties of nanostructured current-carrying coating of polyester film.

The required technical result is achieved due to that in the well-known nanostructured coating of the carrying base comprising layers of amorphous carbon of sp-, sp2- and sp3-hybridized states of carbon atoms, according to the invention, the coating with a highly developed surface of the polyester film base is directly bonded by a layer of the sp3-hybridized state of carbon atoms and has additionally on top a metal layer 25-250 nm thick, with the film base surface having corrugations 10 to 30 gm deep and/or furnished with pores 0.2-0.6 gm in size of a total volume of 10 to 60% and ⅕-⅓ portion of pores being made through.

The distinguishing features allowed the film material with nanostructured coating to achieve a new quality: accumulation of a sufficient electric potential in current-carrying layers insulated with the polyester base with a developed modified surface that is intended to be used as a solid electrolyte capacitor anode.

At the same time an increased physical adhesion of the functional metal layer with the highly-developed adhesive surface of the polyester base was achieved by means of a compatible diamond-like nanolayer of amorphous carbon of the sp3-hybridized state of carbon atoms that allows to produce commercially the proposed film material according to the roll technology in a self-contained packaged plant without breaking the process flow upon moving the film to be pulled through the vacuum chamber with series arranged sources of cooled ions of various materials to be deposited.

Corrugations and pores in the material surface of the polyester base perform, in addition to the direct development of its area, the functions of a so called information matrix by means of which structure layers of coating components to be deposited with an adequate surface development are formed that increases in total multiply (at least 20) the coating surface development factor (the ratio of the actual surface area to its geometric area). In the final analysis the surface development is conductive to the improvement of the material's electrophysical properties that is the aim of the invention.

The direct bond of the relief-developed surface of the polyester base with modifying diamond-like nanolayer increases by an order of magnitude their physical adhesion strength. At the same time the formed relief of the polyester film surface sets the profile and geometry of each layer deposited on top providing an additional surface development of each layer of the coating structure and material as a whole.

The surface development of the material carrying film base provides the improvement of the physical adhesion of the surfaces to be superposed due to a multiple increase of their contact area.

The surface development of the coating metal layer, in addition to the adhesion improvement, enables increasing the specific electric capacity of material being the basic characteristic of the electrolytic capacitor electrode.

The metal coating layer within the selected range of thickness is optimized by service characteristics of the purpose as a solid-electrolyte capacitor plate.

With a metal layer thickness in the coating below 25 nm the electric resistance sharply rises that reduces the capacitor efficiency due to heat losses.

The metal layer thickness over 250 nm governs unjustified expenses because the electric resistance in this case does not change in practice.

Corrugations of the film base surface below 10 nm exert no considerable influence onto the adhesion.

With a corrugation depth over 30 nm the electric field uniformity is broken since potential anomalies appear in the apices of the formed pyramidal profile where local breakdowns are possible.

The presence of pores in the polyester film and in its surface improves the material electrophysical characteristics increasing the development factor and improving the adhesion.

Pores below 0.2 μm in size do not expressly affect the adhesion improvement and form no information matrix in the polyester base, i.e. exert no influence onto the formation of the relief and profile of the coating structure.

The formation of pores over 6 micron in size in the polyester base sharply reduces the film's mechanical strength and worsens the roll technology effectiveness.

The total volume of pores below 10% of the film base creates no notable effect of the improvement of the material's electrophysical properties.

In case of the pore formation in the film base of a total volume over 60% its strength does not correspond to tensile loads when applying the roll technology for the production of material coating.

Producing ⅕ of the pore number as through is insufficient for a reliable coating adhesion with the polyester base.

With a number of through pores in the film base over ⅓ of the total number of pores the polyester film plasticity as a material base is lost.

Consequently, every significant feature is necessary and their aggregate is sufficient for achieving the quality novelty extrinsic to features separately, i.e. the goal put in the invention is achieved as a result of obtaining the effect of feature sum and not their effect sum.

The carried out comparative analysis of the proposed technical solution with found out analogues of the technique level from which the invention does not obviously proceed for a specialist in material science demonstrated that it was unknown and taking into consideration the possibility of commercial series production of polyester film with nanostructured coating a conclusion on the conformity to patentability criteria can be made.

The essence of invention is explained with the drawing where the plant for the roll technology to produce the proposed film material is schematically illustrated.

The plant comprises vacuum chamber I furnished with lock devices 2 through which film 3 to be processed is fed from feed reel 4 via roller system 5 to winding reel 6.

Chamber 1 is furnished with cooled process reel 7 which is adjoined with ion-beam radiators 8, 9 and magnetron 10 arranged in series in subchambers and blocked with nipples 11, 12, 13 of the gas-letting system according to mixture of oxygen with nitrogen, cyclohexane and argon.

The process of the material production according to the invention is performed as follows.

To initiate gas release from polymer film 3 in the ion-plasmous surface treatment process reel 7 is cooled to a temperature of minus 50-100° C. freezing out water that is a main source of gas release. At the same time film 3 is additionally degassed and its burning is prevented.

The preliminary ion treatment of the polyethylene terephthalate film surface in nitrogen-oxygen mixture results in the carbonyl group disintegration and its hydrophobization. The film surface becomes non-polar and rough due to the relief formation developing the contact surface with structural coating streaks to be deposited.

When film 3 moves at a speed of 0.3 m/min its surface profile develops in vacuum chamber 1 in series in the automatic mode under the action of ion-beam flow from radiator 8 in the nitrogen-oxygen mixture environment due to the corrugation formation to a depth of 10-30 nm and/or pore formation 0.2-6 μm in size by special processes, regimes whose parameters are beyond the described process and are a know-how subject.

Pores are equidistributed across the bulk of film 3 and amount to 10-60%, with ⅕-⅓ portion of the formed pores made as through.

The ion treatment of the polyester film surface 3 influences upon carbonyl groups (C=O) with the formation of radicals in their subsequent recombination forming cross bonds C—O—O—C that is confirmed by its surface hydrophobiness and high value of limiting wetting angles, low value of the polar component of the surface energy related to the reduced number of polar groups in the polyethylene terephthalate film surface 3.

Further, the developed film surface 3 is modified in the cyclohexane environment under the action of ion-beam radiator 9 due to depositing amorphous carbon atoms of the sp3-hybrodizied state forming a layer 5-50 nm thick. The formed nanolayer contains an amorphous phase of carbon-a-C characterized by the structure with coordination number 4 like diamond that enables qualifying it as diamond-like.

A highly developed geometric relief is produced on the surface of modified film 3 and an energy relief of the surface saturated with excess energy is formed that increases adhesion up to 200 fold.

This carbon-based nanolayer possesses semi-conducting properties and the film with a diamond-like coating layer has a 1.5-2.0-fold increase in the electric strength. A charge is generated in surface layers of polymer, the surface conductivity increases by an order of magnitude, the bulk conductivity of modified film 3 increases two fold.

Nanodimensional diamond-like coating of polyester film 3 ensures the increase of the critical value of the electric field (field strength in which breakdown occurs) two fold that improves the operational characteristics of solid electrolyte anodes for metal-film capacitors produced on its base.

Then ions of metal are deposited onto the formed adhesive carbon sublayer of modified film surface 3 by means of magnetron 10 in the argon environment that prevents the current-carrying coating to be deposited from being contaminated with oxides requiring no active gas exhaust from the subchamber.

At the same time it should be pointed out that the vapor-phase deposition of a metal layer 25250 nm thick in the argon environment ensures a maximum adhesion (over 1.5 N/mm) as compared with the traditional metallization environments.

It was found out that with increase in the discharge voltage (4.5-5.5 kV) the aluminum and copper layer adhesion to the activated surface of polyethylene terephthalate film 3 increased.

The current-carrying metal layer is formed within the optimized range of thickness from conditions of functioning of electrolytic capacitors within a wide range of the electric capacity with a reliable work during a long operation period.

The surface opposite to film 3 is treated by the described sequence of actions pulling once more the reversed roll with semi-product removed from feed reel 6. Depositing composite coating on two sides simultaneously in one pass of film 3 is possible in principle that is related with extra expenses.

Electrodes of specified dimensions are punched out of finished polyester metallized film, the said electrodes in aggregate with solid electrolyte deposited onto the coating surface are used as anodes of compact and electrically capacious capacitors in which applied energy is stored in a thin layer of bulk charge at the electrode-electrolyte interface.

Electrolytic capacitors in which anodes made of the proposed polyester film with nano-structured composite coating on the modified surface are used have a relatively low consumer cost at a high specific power and stability of charge-discharge characteristics within a wide temperature range of operation.

What we claim is:

1. A nanostructured coating of a carrying base, the carrying base having a plurality of amorphous carbon layers, wherein atoms of the carbon layers are in one or more of sp-, sp2 and sp3-hybridized states, the nanostructured coating including:
   a polyester film having a highly developed surface, the polyester film being directly bonded to the carrying base at the highly developed surface by a layer of sp3-hybridized state of carbon atoms; and
   a metal layer on top of the polyester film, the metal layer being a current carrying layer insulated from the carrying base by the polyester film.

2. The nanostructured coating of claim 1, wherein the layer of sp3-hybridized state of carbon atoms is a diamond-like layer.

3. The nanostructured coating of claim 1, wherein the layer of sp3-hybridized state of carbon atoms is 5-50 nm thick.

4. The nanostructured coating of claim 1, wherein the metal layer is 25 to 250 nm thick.

5. The nanostructured coating of claim 1, wherein the highly developed surface of the polyester film is developed by corrugations of 10 to 30 gm deep.

6. The nanostructured coating of claim 1, wherein the highly developed surface of the polyester film is developed by pores having size of 0.2-0.6 gm.

7. The nanostructured coating of claim 6, wherein the pores occupy 10-60% of the currying base.

8. The nanostructured coating of claim 6, wherein the ⅕-⅓ of the pores are made all the way through the surface.

9. The nanostructured coating of claim 1, wherein the highly developed surface of the polyester film is developed by corrugations of 10 to 30 gm deep and by pores having size of 0.2-0.6 gm.

10. The nanostructured coating of claim 9, wherein the pores occupy 10-60% of the currying base.

11. The nanostructured coating of claim 9, wherein the ⅕-⅓ of the pores are made all the way through the surface.

12. The nanostructured coating of claim 9, wherein the corrugations and the pores develop the surface of the polyester film by a development factor of 20, the development factor being a ratio of an actual surface area to its geometric area.

13. The nanostructured coating of claim 1, wherein the development of the surface of the polyester film improves adhesion of the polyester film to the carrying base and improves electric capacity of the nanostructured coating.

* * * * *